(12) United States Patent
Eidson

(10) Patent No.: US 6,687,772 B1
(45) Date of Patent: Feb. 3, 2004

(54) TRANSDUCERS WITH ELECTRONIC DATA SHEETS THAT ENABLE TRANSDUCER ACCESS USING MULTIPLE TYPES OF TRANSDUCER OBJECT MODELS

(75) Inventor: John C. Eidson, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/020,630

(22) Filed: Feb. 9, 1998

(51) Int. Cl.$^7$ .............................................. B06F 13/12
(52) U.S. Cl. ........................... 710/65; 710/11; 710/30; 710/315
(58) Field of Search ................... 340/870.11; 370/466, 370/467; 709/217, 230, 232; 710/11, 30, 315

(56) References Cited

U.S. PATENT DOCUMENTS

| | | | | |
|---|---|---|---|---|
| 5,650,777 A | * | 7/1997 | Westfield et al. | ...... 340/870.11 |
| 5,717,385 A | * | 2/1998 | Kogure | |
| 5,764,891 A | * | 6/1998 | Warrior | |
| 5,923,557 A | * | 7/1999 | Eidson | |
| 5,941,966 A | * | 8/1999 | Gotze et al. | |
| 5,963,147 A | * | 10/1999 | Westfield et al. | ...... 340/870.11 |
| 6,032,203 A | * | 2/2000 | Heidhues | ...................... 710/11 |
| 6,047,219 A | * | 4/2000 | Eidson | |
| 6,104,962 A | * | 8/2000 | Sastry | |
| 6,115,713 A | * | 9/2000 | Pascussi et al. | |
| 6,151,640 A | * | 11/2000 | Buda et al. | ................... 710/11 |
| 6,307,483 B1 | * | 10/2001 | Westfield et al. | ...... 340/870.11 |
| 6,308,255 B1 | * | 10/2001 | Gorishek, IV et al. | |
| 6,333,940 B1 | * | 12/2001 | Baydar et al. | .............. 370/466 |
| 6,385,193 B1 | * | 5/2002 | Civanlar et al. | ............ 370/466 |
| 6,385,769 B1 | * | 5/2002 | Lewallen | |
| 2001/0045882 A1 | * | 11/2001 | Kogure | |

* cited by examiner

Primary Examiner—Le Hien Luu
Assistant Examiner—Stephan Willett

(57) ABSTRACT

A distributed control system includes a transducer having an electronic data sheet that enables it to be accessed via a variety of differing types of field-bus networks. The electronic data sheet stores a set of object information corresponding to a set of differing object models associated with the differing types of field-bus networks. The distributed control system includes a component node which couples to a particular one of the differing types of field-bus networks and which couples to the transducer through a standard interface. The component node translates between the particular one of the object models and the standard interface during an access of the transducer that originates on the particular one of the differing types of field-bus networks.

16 Claims, 3 Drawing Sheets

TRANSDUCERS WITH ELECTRONIC DATA SHEETS THAT ENABLE TRANSDUCER ACCESS USING MULTIPLE TYPES OF TRANSDUCER OBJECT MODELS

BACKGROUND OF THE INVENTION

1. Field of Invention

The present invention pertains to the field of control systems. More particularly, this invention relates to network independent transducers for distributed control systems.

2. Art Background

A distributed control system commonly includes a set of transducers and application controllers which are arranged to provide control of industrial and other applications. The transducers that may be employed in a distributed control system include sensors such as temperature sensors, pressure sensors, tachometers, etc. The transducers that may be employed in a distributed control system also include actuators such as valves, motors, heaters etc. Application controllers in a distributed control system may be implemented with programmable logic controllers or computer systems.

The transducers and application controllers of a distributed control system may be interconnected via a communication network. Such a communication network may be implemented with one or more of a variety of differing field-level control buses which are specialized for the process control environment. Such specialized buses may be referred to generally as field-buses. The transducers and application controllers are usually connected as nodes on such a field-bus network.

Typically, existing field-bus networks represent the transducers in a distributed control system using a particular object model. In addition, the object models of transducers usually differ among existing field bus networks. For example, SDS networks have a transducer object model that is incompatible with the transducer object model used in a DeviceNet network.

As a consequence, the manufacturers of transducers must typically provide permutations of their transducers for each of the field bus networks for which they desire to market their products. Typically, each permutation of a transducer is designed and manufactured with the appropriate network interface elements that enable the transducer to be accessed via a particular field bus using the object model appropriate for the particular field-bus. Unfortunately, the permutations of network interface designs for the differing types of field bus networks greatly increases the time and cost required to develop new transducers and increases the cost of supporting the transducers in the field.

SUMMARY OF THE INVENTION

A distributed control system is disclosed which includes a network-independent transducer and an electronic data sheet that enables the transducer to be accessed via a variety of differing types of field-bus networks. The electronic data sheet stores a set of object information corresponding to a set of differing object models associated with the differing types of field-bus networks. The distributed control system includes a component node which couples to a particular one of the differing types of field-bus networks and which couples to the transducer through a standard interface. The component node uses the object information to translate between the particular one of the object models and the standard interface during an access of the transducer that originates on the particular one of the differing types of field-bus networks. The electronic data sheet allows the transducer to be employed in a variety of field-bus networks without modifications to existing control system applications.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
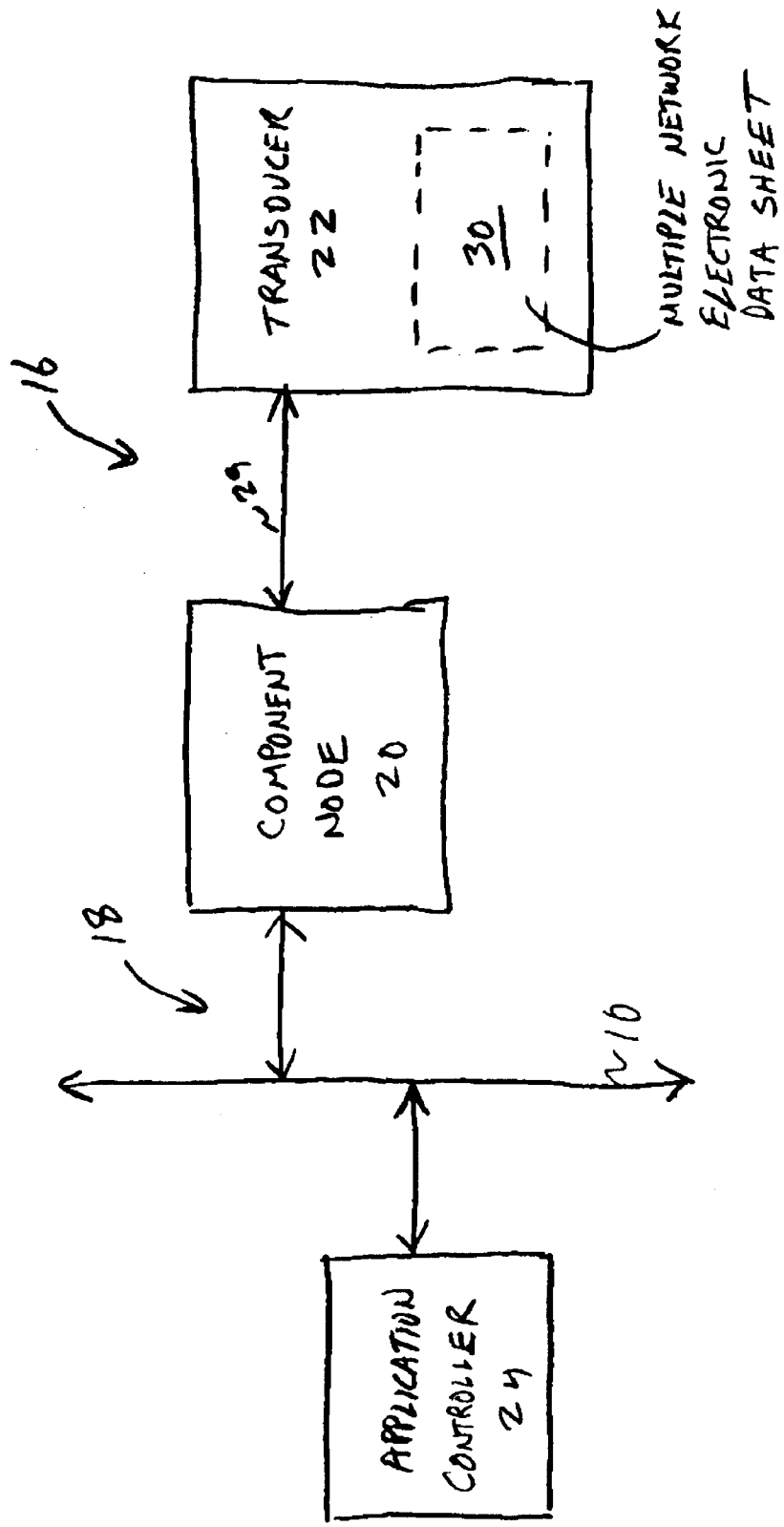
FIG. 1 shows a distributed control system including a transducer having a multiple network electronic data sheet (MNEDS) that enables it to be accessed via a variety of differing types of field-bus networks.

FIG. 1 shows a distributed control system 100 including a transducer 22 having a multiple network electronic data sheet (MNEDS) 30 that enables it to be accessed via a variety of differing types of field-bus networks. The distributed control system 100 includes a component node 20 that interfaces the transducer 22 to a field-bus network 10.

The transducer MNEDS 30 stores a set of object information corresponding to each of a set of differing object models associated with the differing types of field-bus networks which may be embodied in the field-bus network 10. In one embodiment, the MNEDS 30 is a persistent memory in the transducer 22.

The field-bus network 10 is one of a variety of field level control buses adapted for the process control environment. The field-bus network 10 may be an SDS bus, a DeviceNet bus, a LonTalk bus, an Echelon bus, a Foundation Fieldbus, or a Profibus to name a few examples. These differing types of field level control buses generally employ differing object models for the transducer 22.

Other nodes on the field-bus network 10 such as an application controller 24 view the transducer 22 according to a predetermined object model 18 that is associated with the field-bus network 10. For example, if the field-bus network 10 is an SDS bus then the predetermined object model 18 is an object model that is associated with the SDS protocol. Similarly, if the field-bus network 10 is a Profibus bus, then the predetermined object model 18 is an object model that is associated with the SDS protocol.

The MNEDS 30 enables the component node 20 to translate between the object model 18 and a device-oriented interface 16 which is used to interface the component node 20 to the transducer 22.

The device-oriented interface 16 provides a set of channels for the transducer 22. Each channel, in general, is associated with a variable of the transducer 22. For example, the transducer 22 may be a combined temperature and pressure sensor in which temperature variables are transferred via a first channel of the device-oriented interface 16 and in which the pressure variables are transferred via a second channel of the device-oriented interface 16. In addition, one or more channels of the device-oriented interface 16 may be used for triggering signals associated with the first and second channels.

One standard interface suitable for use as the device-oriented interface 16 is the IEEE 1451.2 standard. The IEEE 1451.2 standard specifies multiple channels for obtaining device variables and defines a format of information pertaining to each attached device. The information pertaining to a particular attached device describes the type of device, the data rate, units of measure and special triggering requirements, etc. The object model 18 defines a set of methods for accessing one or more objects associated with the transducer 22. In general, an object associated with the transducer 22 is a variable such a measured variable or actuated variable or variables that provide parameters for the measurements and/or actuations performed by the transducer 22. An example of an object associated with a temperature sensor is a temperature variable. Another example of an object associated with a temperature sensor is an update rate variable or a sample rate or sampling period variable depending on the particular object model 18. Examples of objects associated with a heater include a temperature variable and a units variable (degrees F., degrees C.) depending on the particular object model 18.

An example of a method for accessing the objects of the transducer 22 is a GET LIST method. The GET LIST method may be used by the application controller 24 to obtain a list of objects associated with the transducer 22 in terms of the object model 18. Another example of a method is a READ method which may be used by the application controller 24 to obtain values associated with one or more objects of the transducer 22. Another example of a method is a WRITE method which may be used by the application controller 24 to write values associated with one or more objects of the transducer 22.

Figure 2:
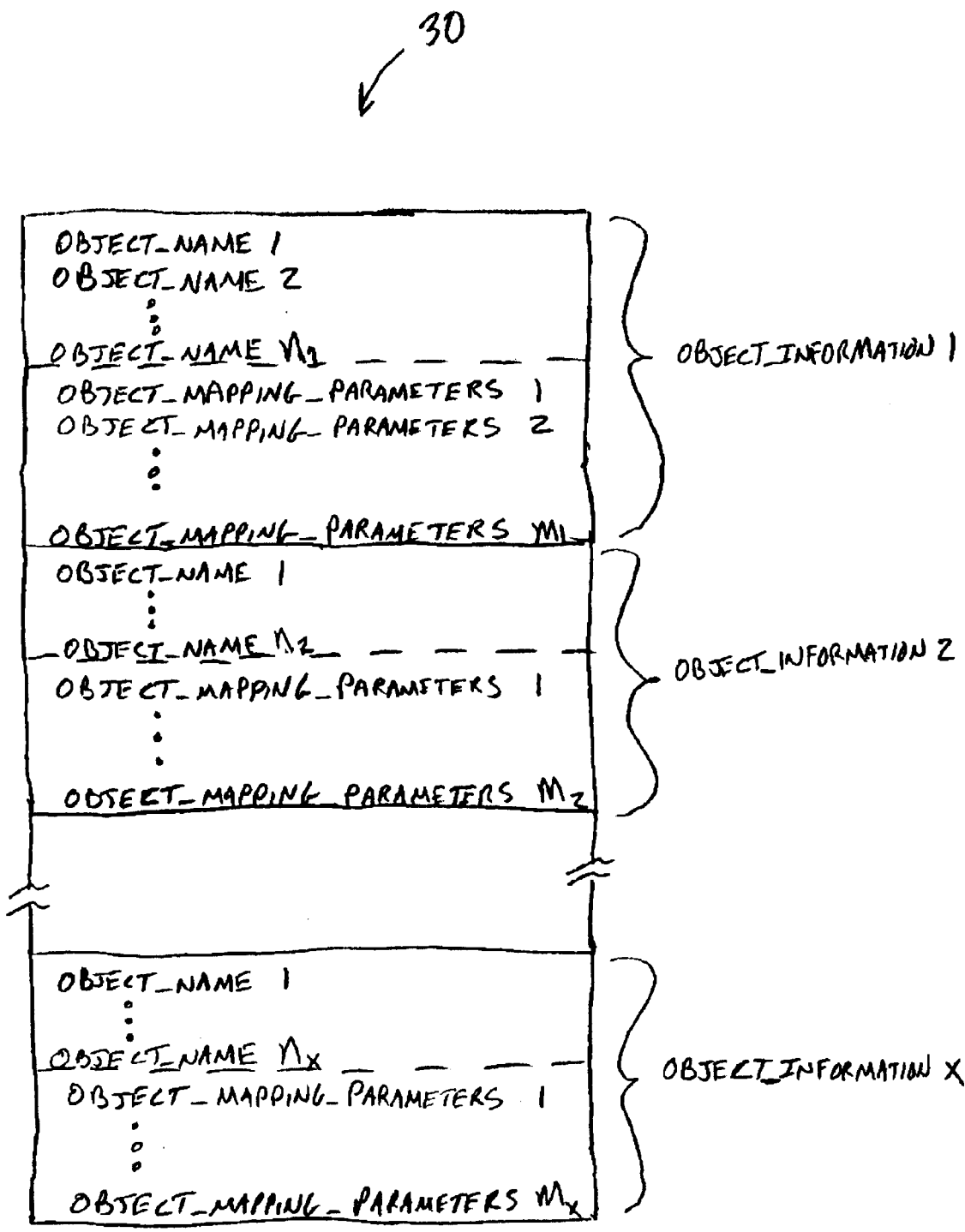
FIG. 2 illustrates the information contained in the MNEDS in one embodiment.

FIG. 2 illustrates the information contained in the MNEDS 30 in one embodiment. The MNEDS 30 includes multiple sets of transducer object information 1-x. Each set of object information 1-x is adapted to a particular type for the field-bus network 10. For example, the object information 1 may correspond to an SDS embodiment for the field-bus network 10 and the object information 2 may correspond to a Profibus embodiment for the field-bus network 10.

The manufacturer of the transducer 22 provides the sets of transducer object information 1-x in the MNEDS 30 to cover each particular type of field-bus network to which it is desired to employ the transducer 22. The transducer object information 1-x enables the transducer 22 to be employed in any of the field-bus networks included in the MNEDS 30 without modification to existing control system applications. In addition, the object information 1-x in the MNEDS 30 enables the component 20 to interface to a variety of differing transducers from differing manufacturers without having to be customized for each particular transducer type.

Each set of object information 1-x includes a set of object_names 1-n and a set of object_mapping_parameters 1-m. The object_names 1-n provide a list one or more object names associated with the transducer 22 in terms of the corresponding object model. For example, if the transducer 22 is a temperature sensor then the object_names 1-n may include temperature, units, and rate in one particular object model and may include temperature and sample period in another object model. In another example, if the transducer 22 is a combined temperature sensor and pressure sensor then the object_names 1-n in a particular object model may include temperature, temperature units, temperature update rate, pressure, pressure units, and pressure update rate.

The object_mapping_parameters 1-m provide a set of one or more parameters that enable the component node 20 to translate between the corresponding object model and the device-oriented interface 16. For example, the object_mapping_parameters $1-m_1$ may correspond to an SDS object model and enable a translation between the SDS object model and the device-oriented interface 16.

As a translation example, if the transducer 22 is a temperature sensor then the object_mapping_parameters 1-m may include a list of channels of the device-oriented interface 16 that are used for the temperature, units, and update rate variables of the transducer 22 as may be defined in the corresponding object model. The object_mapping_parameters 1-m may include an indication of whether the transducer 22 requires a triggering event in order to obtain a measurement if, for example, the correspond object model does not define a triggering event object.

At reset or system initialization, the component node 20 determines a type of the field-bus network 10 to which it is attached and then reads the appropriate set of object information 1-x from the MNEDS 30. For example, if the component node 20 determines that it is attached to an SDS bus then it reads from the MNEDS 30 the set of object information 1-x that corresponds to an SDS field-bus network.

The MNEDS 30 may alternatively be contained in the component node 20 in, for example, a persistent memory.

The component node 20 handles messages received via the field-bus network 10 using the information obtained from the MNEDS 30. For example, if a message received from the application controller 24 via the field-bus network 10 contains a GET LIST command, then the component 20 transfers the object_names 1-n obtained from the MNEDS 30 back to the application controller 24 in a response message.

A message received from the application controller 24 via the field-bus network 10 may contain a READ command that specifies one or more of the object_names 1-n associated with the transducer 22. In response, the component 20 uses the object_mapping_parameters 1-m obtained from the MNEDS 30 to read the transducer 22 using the device-oriented interface 16. For example, one of the object_mapping_parameters 1-m may specify a particular channel of the device-oriented interface 16 for an object_name contained in READ command in which case the component node 20 reads the specified channel and returns the value read from the specified channel back to the application controller 24. In another example, one of the object_mapping_parameters 1-m may indicate that a trigger on a particular channel of the device-oriented interface 16 is required to read the object_name contained in the READ command in which case the component node 20 generates the trigger on the particular channel before reading a value from the channel associated with object_name contained in READ command.

A message received from the application controller 24 via the field-bus network 10 may contain a WRITE command that specifies one or more of the object_names 1-n associated with the transducer 22. In response, the component 20 uses the object_mapping_parameters 1-m obtained from the MNEDS 30 to write a value or values contained in the message to the transducer 22 using the device-oriented interface 16. For example, one of the object mapping_parameters 1-m may specify a particular channel of the device-oriented interface 16 for an object_name contained in WRITE command in which case the component node 20 writes the specified channel with a value contained in the message.

Figure 3:
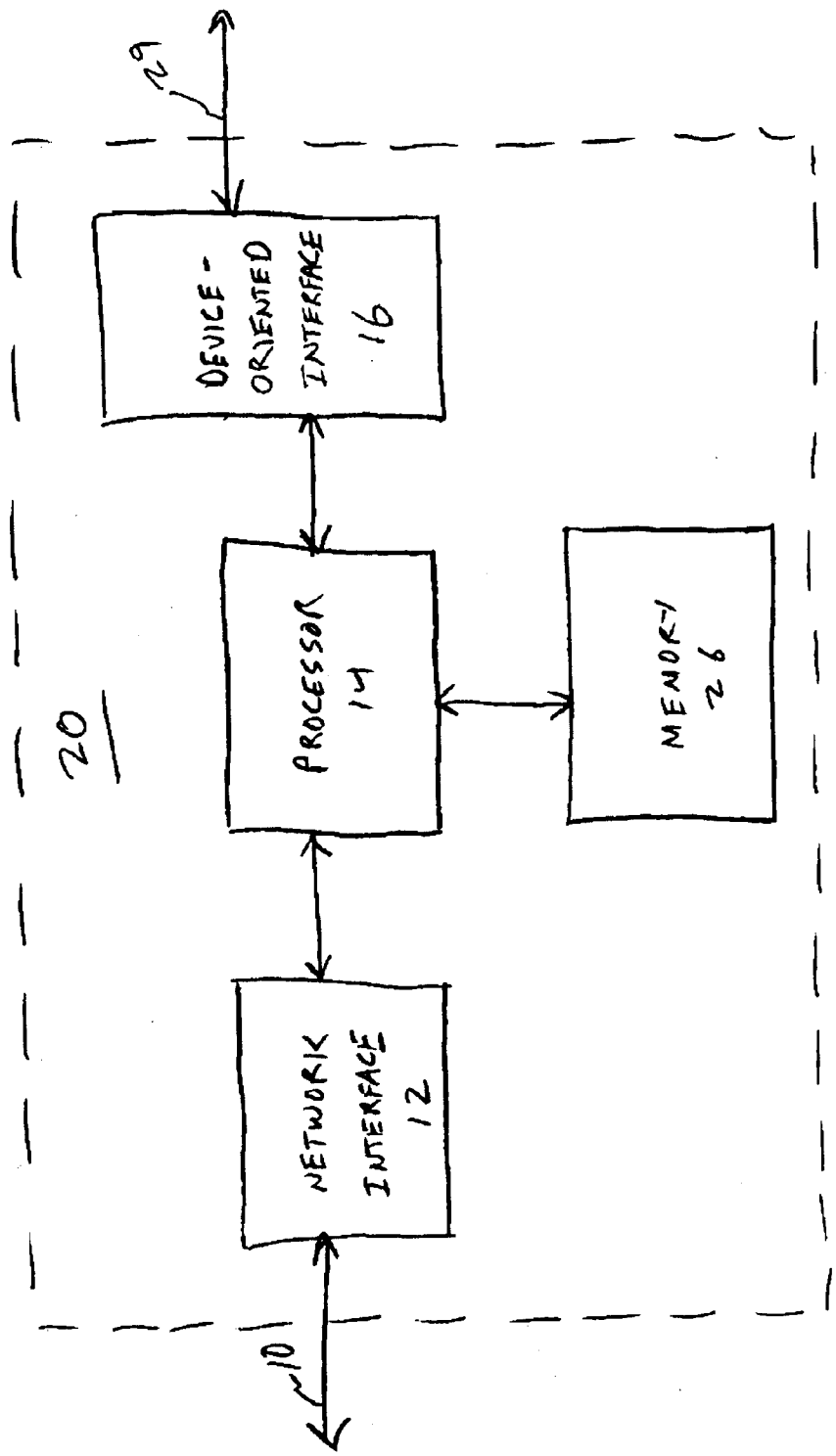
FIG. 3 illustrates one embodiment of a component node which translates between a network object model and a standard transducer interface.

FIG. 3 illustrates one embodiment of the component node 20. The component node 20 in this embodiment includes a network interface 12, a processor 14, a memory 26, and a device-oriented interface 16.

The network interface 12 enables communication over the field-bus network 10 according to a protocol associated with the field-bus network 10. For example, if the field-bus network 10 is embodied as an SDS bus then the network interface 12 is adapted to the SDS protocol. Similarly, if the field-bus network 10 is embodied as a LonTalk bus then the network interface 12 is adapted to the LonTalk protocol.

The network interface 12 represents a combination of hardware and software for transmitting and receiving messages via the field-bus network 10. The messages may include commands for accessing the transducer 22 according to the object model 18 associated with the particular type of the field-bus network 10 and messages for transporting transducer data back to the originating nodes via the field-bus network 10 according to the object model 18.

The device-oriented interface 16 enables communication between the processor 14 and the transducer 22 via a communication link 29. The device-oriented interface 16 represents a combination of hardware and software that in one embodiment implements the IEEE 1451.2 standard.

At system reset or initialization, the processor 14 reads the appropriate set of object information 1-x from the MNEDS 30 of the transducer 22 via the device oriented-interface 16 depending on the type of the object model 18. The type of the object model 18 corresponds to the type of the field-bus network 10 which is indicated by the particular implementation of the network interface 12. The processor 14 copies the object information 1-x obtained from the MNEDS 30 into the memory 26 for use when handling commands received via the field-bus network 10. Alternatively, the memory 26 may be a persistent memory which is preprogrammed with the sets of object information 1-x.

After initializing the memory 26.with the appropriate object_information 1-x, the processor 14 receives messages via the network interface 12 that contain access requests for the transducer 22 in terms of the object model 18. These access requests may imply methods such as GET LIST, READ value, and WRITE value, depending on the object model 18. The processor 14 executes code for translating each of these access requests. The code for translating the access..requests may be contained in the memory 26 or in separate memory such as a persistent memory.

For example, the processor 14 when executing the code for translating the GET LIST method may read the object_ names 1-n from the memory 26 and transfer them back to a requesting node or nodes via the network interface 12. As another example, the processor 14 when executing the code for translating the READ method may read the object_ mapping_parameters 1-m from the memory 26 and use these parameters to translate the read between the object model 18 and the device-oriented protocol 16 in a manner previously described. Similarly, the processor 14 when executing the code for translating the WRITE method may read the object_mapping_parameters 1-m from the memory 26 and use these parameters to translate the write between the object model 18 and the device-oriented protocol 16.

In one embodiment, the IEEE 1451.2 standard provides for a set interface-specific configuration information that may be stored in a device and the MNEDS 30 is an extension of that interface-specific information in the transducer 22.

In an alternative embodiment, the MNEDS 30 stores multiple sets of routines for implementing the methods implied by the object model 18. For example, the MNEDS 30 may store a set of routines for the methods implied by the SDS protocol and a set of routines for the methods implied by the Profibus protocol, etc. At power up or initialization the processor 14 determines the type of the field-bus network 10, i.e. the type of the object model 18, an then copies the appropriate set of routines from the MNEDS 30 into the memory 26.

Each set of routines copied into the memory 26 may include, for example, a GET LIST routine, a READ routine, and a WRITE routine each of which is adapted to the particular object model 18. Each of these routines is coded in order to carry out the appropriate translation between the object model 18 and the device-oriented interface 16.

For example, a GET LIST routine for a particular object model may be coded with a list of object_names associated with the transducer 22 in terms of the particular object model. The processor 14 when executing the GET LIST routine for the particular object model may generate a message containing these object_names in terms of the particular object model and then transfer the message back to the requesting node via the field-bus network 10.

As another example, a READ routine for a particular object model may be coded with specific triggering behavior required to access the transducer 22 through the device-oriented interface 16 even though the particular object model does not specify any triggering for the transducer 22. Similarly, a WRITE routine for a particular object model may be coded with specialized behavior for reading the transducer 22 in terms of the device-oriented interface 16 and the particular design of the transducer 22.

The special handling encoded in the READ and WRITE routines for a particular object model may include the manipulation of triggering channels on the device-oriented interface 16. The special handling encoded in the READ and WRITE routines may also include special data handling or data conversion procedures such as units conversion. The special handling encoded in the read and write routines may include parameter conversion such as a conversion between a sample period specified by the particular object model and a sample rate which is required by the transducer 22.

The special handling encoded in the READ and WRITE routines for each particular object model supported in the MNEDS 30 enables the manufacturer of the transducer 22 to implement special handling for the transducer 22 and shield this special handling from the remainder of any particular system to which the transducer 22 may be attached.

Each of the routines copied into the memory 26 provides a set of code which is directly executable by the processor 14. The routines may be object code for the processor 14 or the processor 14 may include an interpreter for the routines. For example, the processor 14 may execute a Java virtual machine and each of the routines copied into the memory 26 may be a Java applet.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A distributed control system, comprising:

transducer having a standard interface and having an electronic data sheet that stores a set of object information corresponding to each of a set of object models for representing the transducer wherein each object model is characterized by a corresponding set of methods for accessing the transducer;

component node coupled to coupled to the transducer through the standard interface and coupled to a network that represents the transducer using a particular one of the object models, the component node having means for using the object information to translate between the particular one of the object models and the standard interface during an access of the transducer that uses the methods of the particular one of the object models.

2. The distributed control system of claim 1, wherein the component node further comprises means for reading a subset of object information corresponding to the particular one of the object models from the electronic data sheet and for storing the subset of object information for use while translating.

3. The distributed control system of claim 1, wherein each set of object information includes a list of object names associated with the transducer in terms of the corresponding object model.

4. The distributed control system of claim 3, wherein each set of object information further includes a set of object mapping parameters that enable the component node to translate between the corresponding object model and the standard interface.

5. The distributed control system of claim 1, wherein each set of object information includes a set of routines for handling the methods associated with the corresponding object model.

6. The distributed control system of claim 1, wherein at system initialization the component node determines the network to which it is coupled an then reads the corresponding set of object information for the network from the transducer.

7. A transducer for a distributed control system, comprising:

electronic data sheet that stores a set of object information corresponding to each of a set of object models for representing the transducer wherein each object model is characterized by a corresponding set of methods for accessing the transducer;

such that the object information enables a component node to translate between a particular one of the object models and a standard interface to the transducer during an access of the transducer that uses the methods of the particular one of the object models.

8. The transducer of claim 7, wherein each set of object information includes a list of object names associated with the transducer in terms of the corresponding object model.

9. The transducer of claim 8, wherein each set of object information further includes a set of object mapping parameters that enable the component node to translate between the corresponding object model and the standard interface.

10. The transducer of claim 7, wherein each set of object information includes a set of routines for handling methods associated with the corresponding object model.

11. A component node for a distributed control system, comprising:

network interface that enables communication via a network having an object model for representing a transducer wherein the object model is characterized by a set of methods for accessing the transducer;

standard interface that enables communication with the transducer;

processor that reads a set of object information corresponding to the object model from the transducer and translates between the object model and the standard interface during an access of the transducer that uses the methods.

12. The component node of claim 11, wherein the object information includes a list of object names associated with the transducer in terms of the object model.

13. The component node of claim 12, wherein the object information further includes a set of object mapping parameters that enable the component node to translate between the object model and the standard interface.

14. The component node of claim 11, wherein the object information includes a set of routines for handling the methods associated with the object model.

15. The component node of claim 11, wherein at system initialization the processor reads the object information from the transducer.

16. The component node of claim 15, further comprising a memory into which the processor stores the object information read from the transducer at system initialization such that the processor translates between the object model and the standard interface in response to the object information stored in the memory.

* * * * *